(12) United States Patent
Geyer et al.

(10) Patent No.: US 7,200,508 B2
(45) Date of Patent: Apr. 3, 2007

(54) METHOD AND DEVICE FOR MONITORING A CONTROL UNIT OF AN INTERNAL COMBUSTION ENGINE

(75) Inventors: Dirk Geyer, Maxhütte (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/538,153

(22) PCT Filed: Nov. 17, 2003

(86) PCT No.: PCT/DE03/03794

§ 371 (c)(1),
(2), (4) Date: Jun. 8, 2005

(87) PCT Pub. No.: WO2004/055348

PCT Pub. Date: Jul. 1, 2004

(65) Prior Publication Data

US 2006/0089779 A1    Apr. 27, 2006

(30) Foreign Application Priority Data

Dec. 13, 2002  (DE) ................................ 102 58 426

(51) Int. Cl.
*G06F 11/30*    (2006.01)
*G01C 17/38*    (2006.01)

(52) U.S. Cl. .................... 702/96; 60/289; 123/690; 702/185

(58) Field of Classification Search ............... 702/23, 702/35, 96, 113, 185; 60/274, 289; 123/350, 123/435, 676, 679, 690; 701/101, 103
See application file for complete search history.

(56) References Cited

U.S. PATENT DOCUMENTS

| 5,385,134 A | 1/1995 | Krohm et al. |
| 6,189,524 B1 * | 2/2001 | Zhang et al. ............... 123/690 |
| 6,973,777 B2 * | 12/2005 | Bayerle et al. ............... 60/289 |

FOREIGN PATENT DOCUMENTS

| DE | 40 03 752 A1 | 8/1991 |
| DE | 42 43 493 A1 | 6/1994 |
| DE | 197 25 567 A1 | 1/1998 |
| DE | 198 57 183 A1 | 6/2000 |
| DE | 199 46 962 C1 | 1/2001 |
| EP | 1 021 649 B1 | 7/2000 |
| WO | WO 00/52319 | 9/2000 |

* cited by examiner

*Primary Examiner*—John Barlow
*Assistant Examiner*—John Le

(57) ABSTRACT

The invention relates to a method for monitoring a control unit of an internal combustion engine, according to which a variable, which characterises the initial parameter of a lambda regulation system, is monitored for a deviation from a predefined threshold value. An error response takes place in accordance with the deviation that has been determined.

11 Claims, 5 Drawing Sheets

METHOD AND DEVICE FOR MONITORING A CONTROL UNIT OF AN INTERNAL COMBUSTION ENGINE

CROSS REFERENCE TO RELATED APPLICATION

This application is the US National Stage of International Application No. PCT/DE2003/003794, filed Nov. 17, 2003 and claims the benefit thereof. The International Application claims the benefits of German Patent application No. 10258426.5 DE filed Dec. 13, 2002, both of the applications are incorporated by reference herein in their entirety.

FIELD OF THE INVENTION

The invention relates to a method and a device for monitoring a control unit of an internal combustion engine.

BACKGROUND OF THE INVENTION

With modern internal combustion engines, instead of an accelerator pedal being directly coupled to a control element such as a throttle valve which adjusts the load, the load is adjusted electronically by a control unit of the internal combustion engine. Errors in such a control unit can lead to an undesired and uncontrollable acceleration of the motor vehicle. For this reason, these control units must be monitored reliably.

From EP 1 021 649 B1, a method and a device for monitoring a control unit of an internal combustion engine is known in which an estimated value of the fuel mass is calculated which is actually metered per cycle in a cylinder of an internal combustion engine. The estimated value of the fuel mass is calculated as a function of an air ratio which is determined by means of an oxygen probe arranged in the exhaust-gas tract of the internal combustion engine. An estimated value of the indicated torque at the internal combustion engine is calculated as a function of the estimated value of the fuel mass. An emergency run of the internal combustion engine is controlled if the estimated value and a desired value of the indicated torque conform to a predefined condition. Such a monitoring concept is particularly suitable for an internal combustion engine which is operated with a very lean mixture, i.e. with an air ratio which is considerably higher than one. In order to execute this method, a linear lambda probe is required, there being no question of using a cost-effective two-point lambda probe here.

As a result, particularly in the case of internal combustion engines which are operated with a stoichiometric air/fuel ratio, this method leads to undesirably high costs.

A method for diagnosing a fuel supply system is known from WO 00/52319. Depending on a test result, to determine whether or not an output signal of a lambda regulation system is greater than a predefined threshold value over a predetermined period, a permanent error of the high-pressure injection valves of the internal combustion engine is detected.

A method for checking the functionality of a variable valve control system for an internal combustion engine is known From DE 198 57 183 A1. A main load signal is a measuring signal of an air mass sensor. A secondary load signal is derived from an opening angle a throttle valve in the intake pipe. The functionality of the variable valve control system is evaluated on the basis of comparing a main load signal and a secondary load signal.

A method is known From DE 42 43 493 A1, in which, in stationary operating modes, starting from the rotational speed signal and a signal indicating the amount of fuel which is injected, the expected value for the output signal of the lambda probe is predefined. Therefore, an error is detected if the expected value for the output signal of the lambda probe deviates by more than one threshold value from the measured value of the lambda probe.

A method is known From DE 40 03 752 in which, by a signal output by a lambda probe for a deviation of the probe signal exceeding a threshold value, the deviation is allocated to that cylinder of the internal combustion engine for which the exhaust gas has already been detected by the lambda probe.

It is known from DE 197 25 567 A1 that an air/fuel ratio correction coefficient according to the difference between the air/fuel ratio and the desired air/fuel ratio has to be formed. An error in air/fuel ratio sensor or a microprocessor is detected on the basis of an error decision element which is derived from the air/fuel ratio, determined by the air/fuel ratio sensor and the air/fuel ratio correction coefficient.

It is known from DE 199 46 962 C1 that in the case of a lean operation of an internal combustion engine, a plausibility check must be carried out. This consists in requesting whether or not the exhaust gas composition shown in the exhaust gas tract corresponds to a fuel/air mixture lying outside a predefined operating window. In the case of implausibility, a changeover to stoichiometric operation of the internal combustion engine will take place in which case a lambda regulation system is active. The torque will then be monitored in which an actual torque is determined by drawing in a combustion air mass by using a performance graph. In addition, the desired torque requested by the control unit is recorded. If the difference between the desired and the actual torque exceeds a threshold value, then the internal combustion engine will change over to an emergency run.

SUMMARY OF THE INVENTION

Therefore, the object of the invention is to create a simple and at the same time reliable method for monitoring a control unit for an internal combustion engine.

The object of the invention is achieved by the features of the independent claims.

The outstanding feature of the invention is the fact that sufficiently safe operation of the control unit is possible without having to monitor the control elements for the air path. Particularly for modern engine concepts this is a decisive advantage, because these concepts often have several control elements for adjusting the air mass such as, for example, throttle valves, the variable valve train and a turbocharger. It is therefore possible to dispense with redundant sensor arrangements for the individual element in the case of these control elements.

In an advantageous embodiment of the invention, the variable, which characterizes the output parameter of a lambda regulation system, is the output parameter itself. As a result, monitoring is a particularly simple process and at the same time can also be carried out accurately.

Further advantageous embodiments of the invention are defined in the subcliams.

BRIEF DESCRIPTION OF THE DRAWINGS

Embodiments of the invention are described in more detail with reference to the drawings. The figures show.

DETAILED DESCRIPTION OF THE INVENTION

Elements with the same design and function are indicated in all the figures with the same reference symbols.

Figure 1:
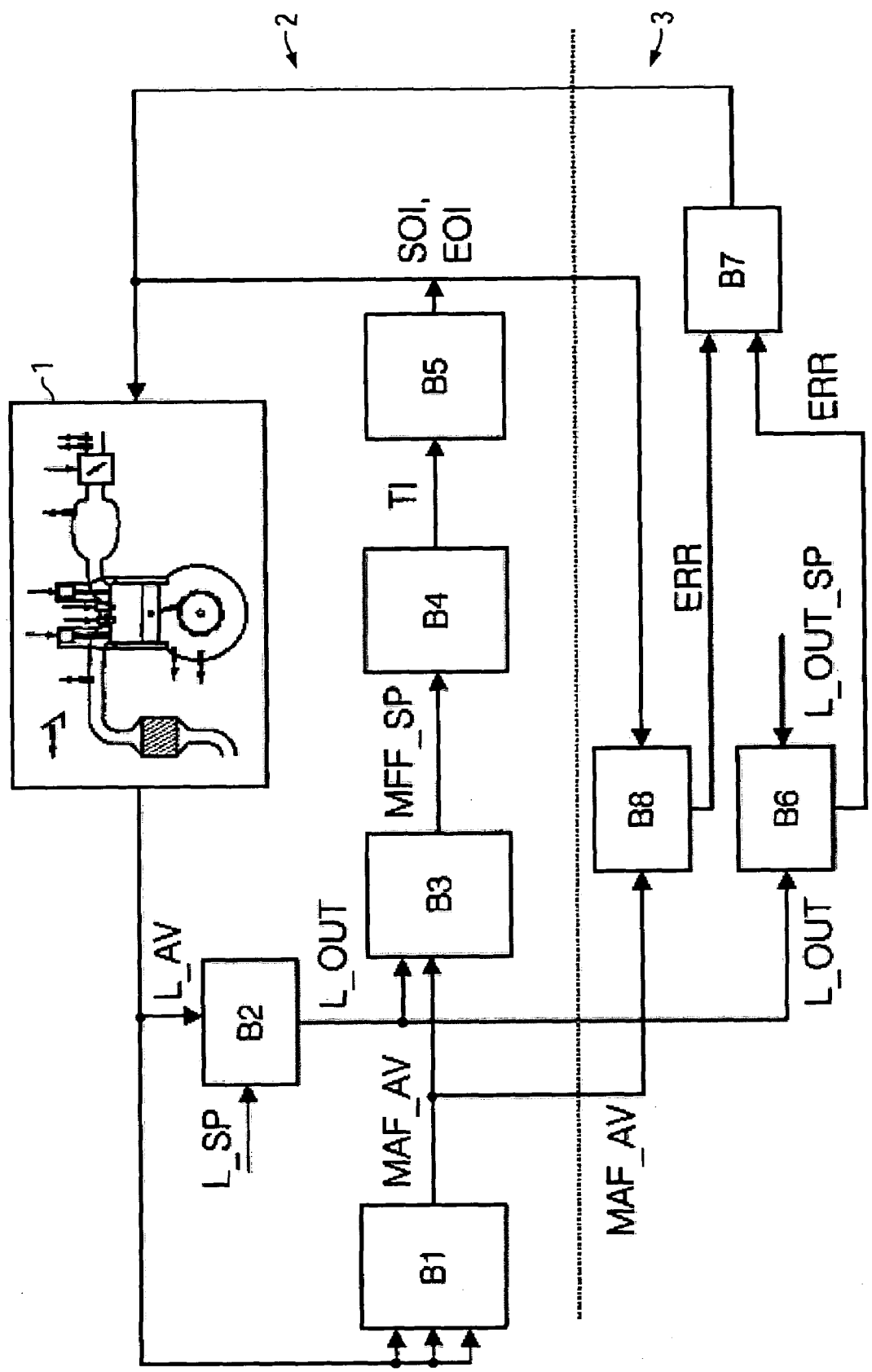
FIG. 1 a block diagram of a control unit for an internal combustion engine and a device for monitoring a control unit, FIG. 2 the first section of a flowchart of a first embodiment, a program for monitoring the control unit, FIG. 3 a second section of a flowchart of an embodiment of the program for monitoring the control unit, FIG. 4 the second section of a flowchart of an additional embodiment of the program for monitoring the control unit, FIG. 5 the first section of a flowchart of an additional embodiment of a program for controlling the internal combustion engine and FIG. 6 a first section of a flowchart of an additional embodiment of a program for controlling the internal combustion engine.

FIG. 1 shows a schematic diagram of an internal combustion engine 1 to which a control unit 2 and a monitoring unit 3 have been allocated. The internal combustion engine 1 has an intake tract with a manifold from where intake pipes are routed to the relevant cylinders. In the drawing, only one exemplary cylinder is shown. In addition, a piston is also provided which is connected to a crankshaft via a connecting rod. An exhaust-gas tract of the internal combustion engine preferably contains a catalytic converter.

Sensors are allocated to control unit 2, said sensors recording different variables and in each case determining the measured value of the variable. The control unit 2, determines as a function of the variables, the adjusting signals for the control elements of the internal combustion engine.

The sensors are embodied as a crankshaft sensor which records a crankshaft angle of the crankshaft or derives the rotational speed N from its timing, an air mass sensor which records an air mass flow, a throttle valve sensor which records a degree of opening of the throttle valve, a fuel pressure sensor which records a fuel pressure FUP, an exhaust-gas probe which records an exhaust gas/air ratio from which the air ratio in the cylinders of the internal combustion engine is then derived and an intake pipe pressure sensor which records the pressure in the manifold and in the intake pipes of the intake tract. Depending on the embodiment of the invention, the above-mentioned sensors may be fewer by any number or there may also be additional sensors.

As control elements, injection valves, spark plugs, the throttle valve and also additional control elements such as gas-changing valves and associated adjusting mechanisms, a turbo charge or an exhaust gas recirculation valve influencing the filling in the cylinders have been provided. In addition, there can also be additional control elements whose use in internal combustion engines is well-known.

In a block B1, an actual value MAF_AV of the air mass flow in the cylinders of the internal combustion engine 1 is determined. This either takes place directly from the measured value of the air mass flow sensor and the actual value MAF_AV of the air mass flow is, however, preferably determined by means of a dynamic model of the intake tract as a function of different operating variables of the internal combustion engine which on its side is again recorded directly or indirectly by the sensors allocated to the internal combustion engine. Determinative operating variables for such an intake pipe model are, for example, the degree of opening of the throttle valve and the rotational speed N.

In a block B2, a lambda regulation system is provided which, as a function of an actual value L_AV of the air ratio which is derived from the measuring signal of the exhaust gas probe and a desired value L_SP of the air ratio, determines an output parameter L_OUT. The lambda regulation system can then, for example, be embodied as a P, PI or PID regulation system, in which case the output parameter L_OUT can also be influenced by additional correction variables. As a result, the desired value L_SP of the air ratio is then typically predefined for a stoichiometric mixture and, therefore, is approximately one.

In a block B3, a desired value MFF_SP of the fuel flow is determined as a function of the actual value MAF_AV of the air mass flow and the output parameter L_OUT of the lambda regulation system.

In a block B4, an injection point in time TI is then determined as a function of the desired value MFF_SP. In a block B5, a start of injection signal SOI and an end of injection signal EOI are then determined as a function of the injection point in time and generated in the end stages of the control unit. The injection valves of the internal combustion engine are then activated with these start of injection and end of injection signals SOI, EOI.

The control unit preferably has a torque-based control structure, i.e. the activation of the control elements of the internal combustion engine depends on the torque requested by the driver which is determined as a function of the position of an accelerator pedal. The torque is then adjusted, on the one hand, via the corresponding activation of the control elements which influence the air mass flow in the cylinders and, on the other hand, via the significantly more dynamic control elements such as the injection valves and the spark plugs.

A monitoring unit 3 is provided which monitors the operation of the control unit. To this end, the monitoring unit can access single or multiple measured variables which have been recorded by the sensors and said unit can also access operating variables and operands determined internally in the control unit 2. The control unit 2 and the monitoring unit 3 can both be arranged in a common housing.

The actual value MAF_AV of the air mass flow determined by the control unit 2 is used, for example, to monitor the desired value TQI_SP of the torque to be adjusted on the internal combustion engine. For this purpose, an actual value of the torque which is generated by the internal combustion engine is determined, for example, as a function of the actual value MAF_AV of the air mass flow. This actual value is then compared to the desired value TQI_SP and an error response takes place if the actual value exceeds the desired value TQI_SP by a predefined threshold value.

In a first embodiment of the monitoring unit 3, a block B6 is provided to which the output parameter L_OUT of the lambda regulation system and a desired value L_OUT_SP of the output parameter of the lambda regulation system are fed. As a function of these two values, an error flag ERR then appears in block B6 if an error was detected in the control unit 2. The accurate procedure concerning this matter is explained in even greater detail on the basis of the following drawings. As a function of the error flag ERR, an emergency run of the internal combustion engine is then controlled in a block B7 which can consist of the fact that the activation of the control element is limited in such a way that no hazardous vehicle reactions can occur.

In another embodiment of the monitoring unit 3, a block B8 is provided to which the actual value MAF_AV of the air mass flow and the start of injection signal SOI and the end of injection signal EO are fed. As a function of these variables, an error flag ERR then appears in this block B8 if an error was detected in the control unit 2. The precise procedure involved is explained in greater detail on the basis of the following drawings.

In a step S1 (FIG. 2), a program is started which is processed in the block B8.

In a step S2, a first threshold value THD1 is determined from performance data as a function of the rotational speed N and from a desired value TQI_SP of the torque. The values of the performance data are then preferably determined by road tests or by means of tests on an engine test stand and are preferably applied in such a way that these values referred to the rotational speed decrease from the lower rotational speed limit, i.e. zero revolutions per minute up to a lower rotational speed threshold of, for example, 1500 revolutions and, for example, remain at a lower value linearly and then, in the range between the lower rotational speed threshold and an upper rotational speed threshold of, for example, 4000 revolutions per minute, increase again up to very high rotational speeds. With regard to the desired value TQI_SP of the torque, information is preferably assigned to the performance data in such a way that the associated first threshold values THD1 in the range of the low up to a higher torque which can, for example, reach ¾ of the maximum achievable torque, have been selected very low and then increase strongly up to the maximum achievable torque. However, in a simpler embodiment, the first threshold value can also be predefined permanently.

In a step S3, the deviation DELTA is determined from the difference, on the one hand, of the amount of the difference of the output parameter L_OUT and the desired value L_OUT_SP of the output parameters of the lambda regulation system and, on the other hand, the first threshold value THD1.

By determining the first threshold value THD1 from the performance data as a function of the load variables, namely, the rotational speed N and the desired value TQI_SP of the torque, it can be guaranteed with the said assigning of information that in the operating ranges with high load dynamics, the deviations of the output parameter L_OUT and its allocated desired value L_OUT_SP will be less important than in ranges with lower load dynamics, in which case the first threshold value is selected to be correspondingly higher. The same advantage can also be obtained if the first threshold value is determined as a function of another load parameter such as, for example, the pressure of the intake pipe. Subsequently, together with step S3, processing is carried out in the step that follows on from connector A.

In a step S4 (see FIG. 3), a summed deviation SUM_D is determined by adding the deviation DELTA. Subsequently, in a step S5 a test is performed to determine whether or not the summed deviation SUM_D exceeds a second predefined threshold value THD_2. If this is not the case, step S2 will again be used to continue with the processing after a predefined waiting period, if required. However, if the condition for step S5 has been met, the error flag ERR appears in a step S6. The program then ends in a step S7.

The procedure according to steps S4 and S5 has the advantage that in a very simple way, short-term failures in the range of the control unit do not lead to an error response, i.e. the appearing of an error flag ERR, but the greater the effect of the failure on a torque-critical variable, the quicker a response then also takes place. The procedure described on the basis of FIGS. 2 and 3, in particular, distinguishes itself by means of the fact that on the basis of the values of the output parameter L_OUT of a lambda regulation system, an error on a control element determining the air mass in the cylinders can be detected in a simple and reliable way. For this purpose, not all the control elements and therefore, in particular, the position sensors allocated to these have to be monitored and subjected to a plausibility check, because on the basis of the output parameter L_OUT, each random deviation between the actually intended quantity of air in the cylinders and the actually metered quantity of air can be detected safely. This procedure ensures that there is an error response before a further malfunction in the area of the control unit, causes the vehicle to accelerate greatly, rendering it uncontrollable.

For example, such a malfunction can be that, on the one hand, the actual value MAF_AV of the air mass flow is lower than the air mass flow actually flowing into the cylinder which then on monitoring the desired value of the torque TQI_SP would not lead to an error response, and, on the other hand, in the case of a too high degree of opening of the throttle value calculated incorrectly in the control unit would lead to an increase in the air mass actually flowing into the cylinders of the internal combustion engine. On the other hand, this would again lead to the fact that the lambda regulation system in block B2 would make available a correspondingly high value of the output parameter L_OUT in the block B3 which, on the other hand, would lead to a strong increase in the desired value MFF_SP of the fuel flow into the cylinders. This would then lead to a suddenly very strong increase in the torque on the crankshaft of the internal combustion engine which would possibly not be detected by monitoring the desired value TQI_SP of the torque.

Figures 2, 3:
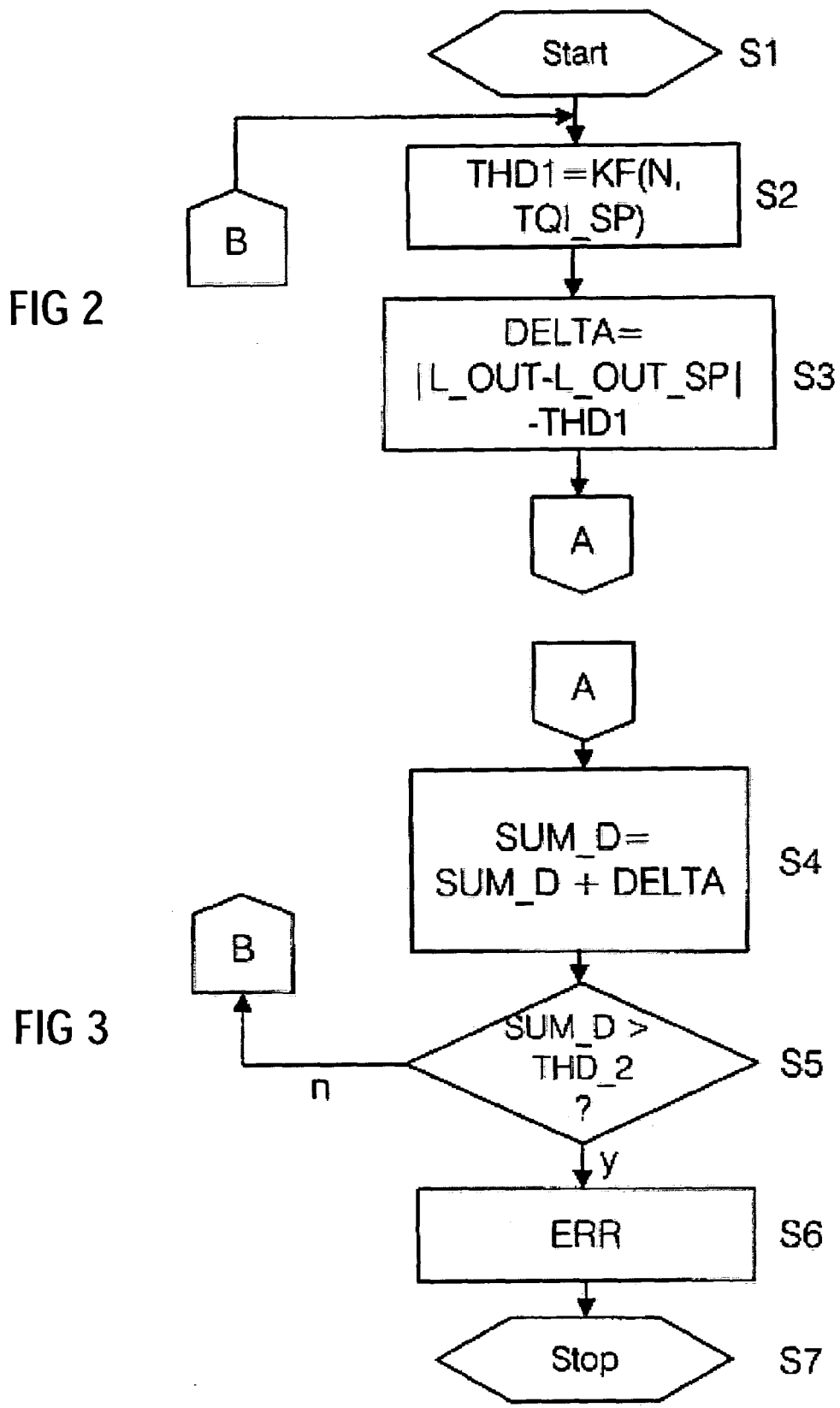
Figure 4:
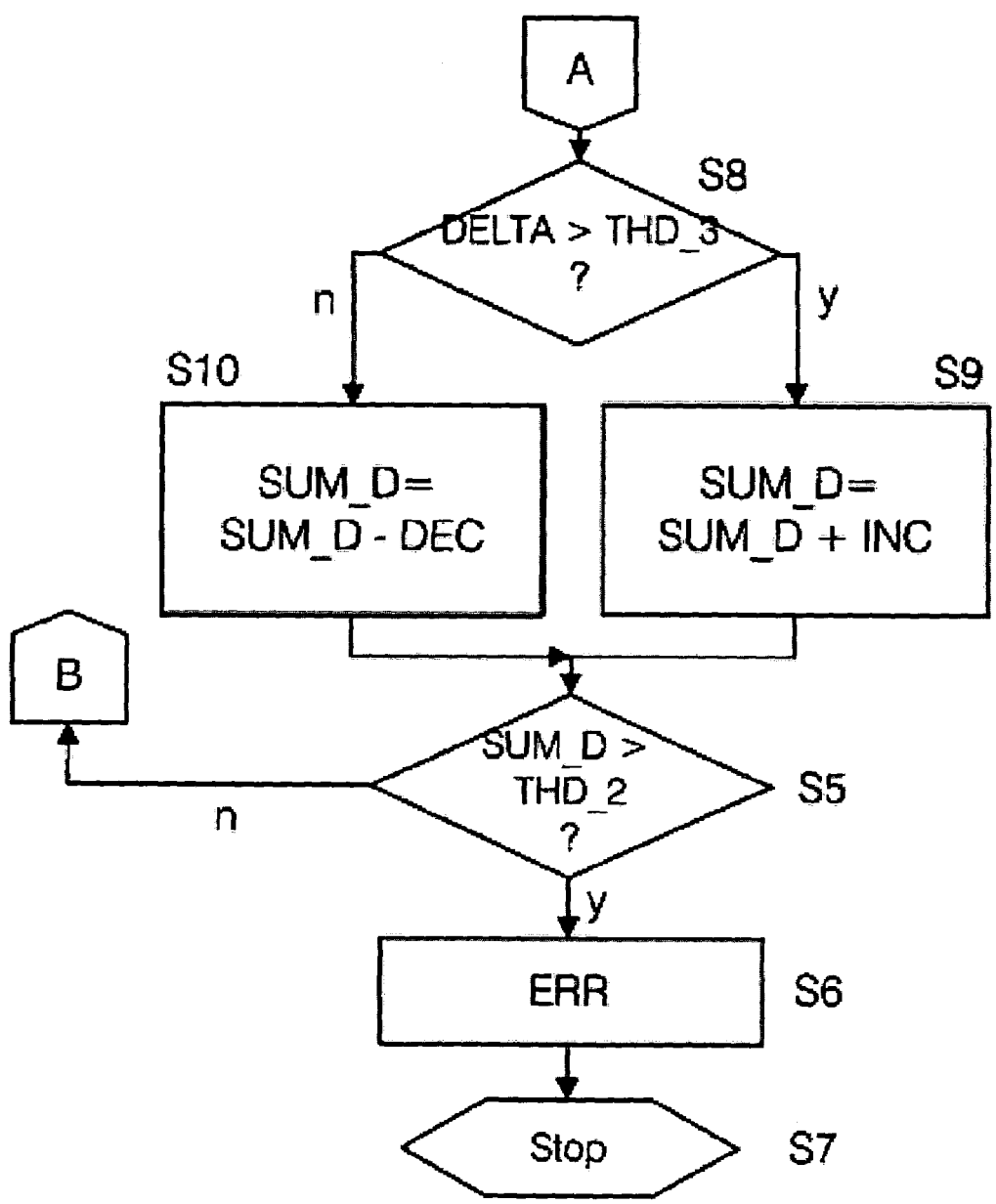

In the embodiment of the program according to FIG. 4, after step S3 according to FIG. 2, the method is continued in a step S8 where a test is carried out in order to determine whether or not the deviation DELTA exceeds a predefined third threshold value THD_3. If this is the case, the summed deviation SUM_D is increased by a predefined increment value INC in a step S9. However, if the condition for step S8 has not been met, then the summed deviation will be reduced by a decrement value DEC in a step S10. The steps S5, S6 and S7 correspond to those according to FIG. 3. When the first threshold value THD_1 has been selected in a suitable manner, the third threshold value can, for example, simply have the value zero.

Figure 5:
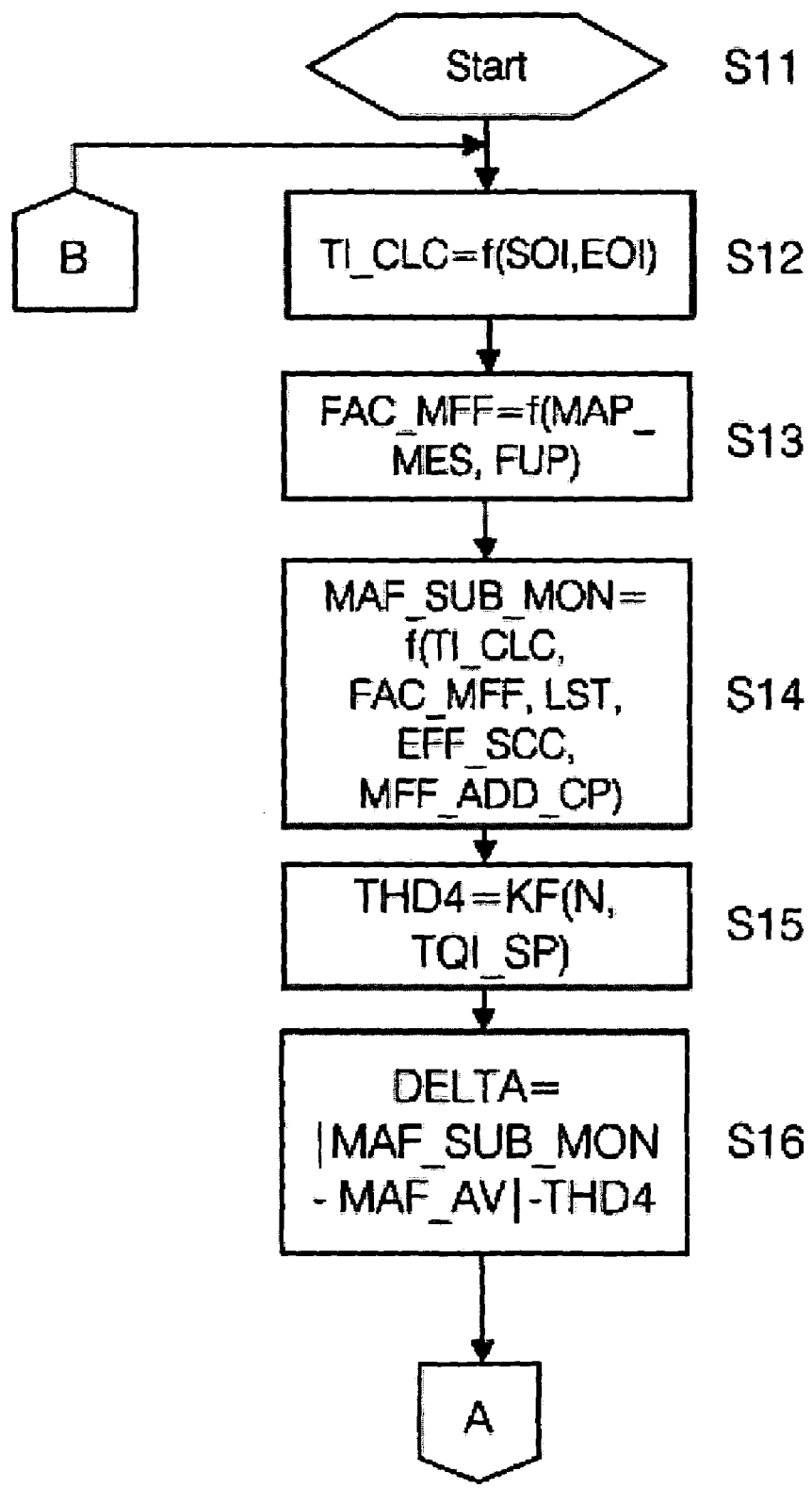

In a further embodiment, the program is started in a step S11 (see FIG. 5). In a step S12, a calculated injection point in time TL_CLC is determined as a function of the start of injection signal SOI or the end of injection signal EOI.

In a step S13, a fuel flow correction value FAC_MFF is then determined as a function of a measured value MAP_MES of the pressure of an intake pipe and a fuel pressure FUP. In a step S14, a monitoring value MAF_MON of the air mass flow is determined as a function of the calculated injection point in time TI_TLC, the fuel flow correction value FAC_MFF, the stoichiometric air ratio LST (14, 7), a cylinder cut-out degree of effectiveness EFF_SCC and a tank vent correction value MFF_ADD_CP and additional variables, if required.

In a step S15, a fourth threshold value THD4 is then determined from performance data as a function of the rotational speed N and the desired value TQI_SP of the torque. The assigning of information to the performance data according to step S15 is then determined in step S2 according to the performance data.

Subsequently, in a step S16 the deviation DELTA is determined from the difference, on the one hand, of the amount of the difference of the monitoring value MAF- _SUB_MON of the air mass flow and the actual value MAF_AV of the air mass flow and, on the other hand, of the fourth threshold value THD4. Processing is then continued in the step allocated to the connect point A. On the one hand, the procedure according to FIG. 5 is characterized in that the monitoring value MAF_SUB_MON can be calculated simply and with a value nevertheless calculated by the control unit and, in addition, even calculation errors of the control unit 2 can be detected in good time and simply in the blocks B3, B4, B5.

A further embodiment of the program distinguishes itself from that of FIG. 5 by the fact that in a step S16a (see FIG. 6), the deviation DELTA is determined, instead of with the monitoring value MAF_SUB_MON of the air mass flow with its derivation in time MAF_SUB_MON_DT and, instead of with the actual value MAF_AV of the air mass flow with the derivation in time of the actual value MAF_AV_DT. This procedure is characterized by means of its small requirement for static accuracy which guarantees a simplified conversion in the monitoring unit 3 and a high degree of robustness.

Figure 6:
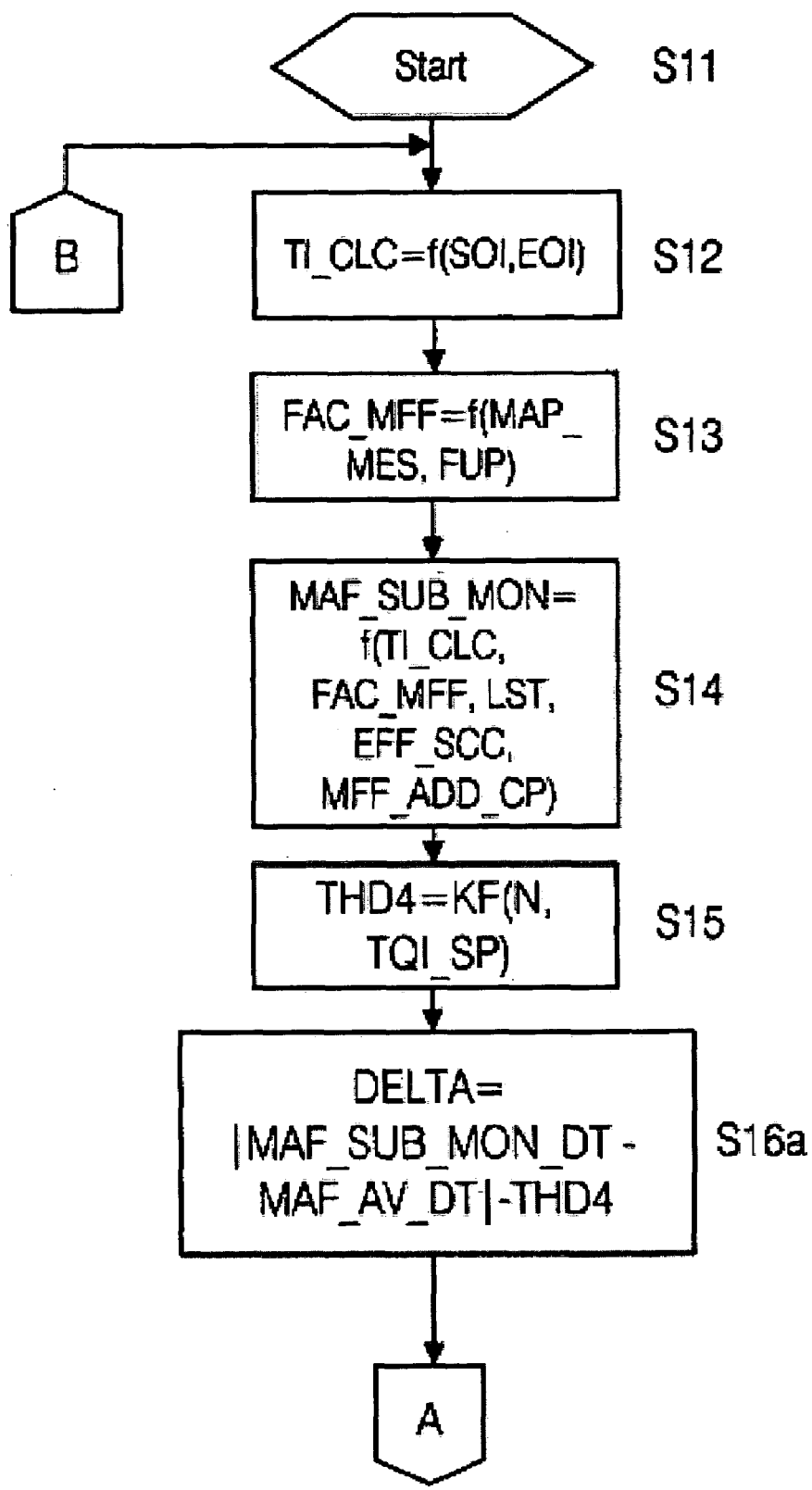

According to step S16a in FIG. 6, it is also possible in a step S3 in FIG. 2 that the derivations in time of the output parameter L_OUT and the desired value L_OUT_SP of the output parameter for determining the deviation DELTA are used in which case the above-described advantages are likewise obtained.

As an alternative to the describe embodiments, in order to determine the deviation DELTA, it is also possible to use another variable which characterizes the output parameter L_OUT of the lambda regulation system. To this end, the desired value MFF_SP and the injection point in time TI are accordingly taken into consideration if in this case the influence of the output parameter L_OUT was considered each time.

A reference value can, for example, be the predefined desired value (L_OUT_SP) of the output parameter of the lambda regulation system or the actual value (MAF_AV) of the air mass flow.

The invention claimed is:

1. A method for monitoring a control unit of an internal combustion engine, comprising:
   monitoring a variable that characterizes the output of a lambda regulating system for a deviation from a predefined reference value; and
   detecting an error by a control element determining the air mass in the cylinder as a function of the deviation that has been determined,
   wherein the variable that characterizes the output parameter of a lambda regulation system is the output parameter, and
   wherein the deviation of the value of the output parameter is compared with a predefined desired value of the output parameter, the deviation is summed, an error is detected if the summed deviation exceeds a predefined threshold value and an error signal is generated by the control unit, the error signal used to help monitor the control element.

2. The method according to claim 1, wherein that from the amount of the deviation, a further threshold value is deducted and this corrected deviation is summed in the case where the other threshold value is determined as a function of a load variable of the internal combustion engine.

3. The method according to claim 2, wherein the load variable is the torque of the internal combustion engine and the rotational speed.

4. The method according to claim 1, wherein the variable that characterizes the output parameter of the lambda regulation system depends on the derivation in time of the output parameter of the lambda regulation system.

5. The method according to claim 1, wherein the variable that characterizes the output parameter of the lambda regulation system is a value of an air mass flow determined from the injection parameters in the cylinders of the internal combustion engine.

6. The method according to claim 1, wherein the variable that characterizes the output parameter of the lambda regulation system depends on a value of an air mass flow determined from the injection parameters in the cylinders of the internal combustion engine.

7. A method for monitoring a control unit of an internal combustion engine, comprising:
   monitoring a variable that characterizes the output of a lambda regulating system for a deviation from a predefined reference value; and
   detecting an error by a control element determining the air mass in the cylinder as a function of the deviation that has been determined,
   wherein the variable that characterizes the output parameter of a lambda regulation system is the output parameter,
   wherein the deviation of the value of the output parameter is compared with a predefined desired value of the output parameter, the deviation is summed, and an error is detected if the summed deviation exceeds a predefined threshold value and an error signal is generated by the control unit and the error signal is used to monitore the control element,
   wherein the variable that characterizes the output parameter of the lambda regulation system is a value of an air mass flow determined from the injection parameters in the cylinders of the internal combustion engine, and
   wherein the value of the air mass flow determined from the injection parameters is determined as a function of a start of injection and an end of injection signal that are generated by the control unit.

8. The method according to claim 7, wherein the deviation of the value of the air mass flow determined from the injection parameters is compared with an actual value of the air mass flow, the deviation is summed, and an error is detected if the summed deviation exceeds a predefined threshold value.

9. The method according to claim 8, wherein the load variable is both the torque of the internal combustion engine and the rotational speed.

10. The method according to claim 7, wherein a further threshold value is deducted from the amount of the deviation and this corrected deviation is then summed in the case the other threshold value is determined as a function of at least one of the load variables of the internal combustion engine.

11. A device for monitoring a control unit for an internal combustion engine, comprising:
   a plurality of sensors that generate measured variables, wherein the variables characterize an output parameter of a lambda regulation system; and
   a monitoring unit that accesses the measured variables and monitors the variables for a deviation from a predefined threshold value and detects an error of a control element that determines the air mass in a cylinder of the engine as a function of the deviation, wherein the deviation of the value of the output parameter is compared with a predefined desired value of the output parameter, the deviation is summed, an error is detected if the summed deviation exceeds a predefined threshold value and an error signal is generated by the control unit to help monitor the control element.

* * * * *